(12) United States Patent
Naruse et al.

(10) Patent No.: US 7,467,626 B2
(45) Date of Patent: Dec. 23, 2008

(54) IGNITION DEVICE OF IGNITION CONTROL SYSTEM FOR AN INTERNAL COMBUSTION ENGINE

(75) Inventors: Yusuke Naruse, Tokyo (JP); Koichi Okamura, Tokyo (JP); Futoshi Aida, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 11/798,065

(22) Filed: May 10, 2007

(65) Prior Publication Data

US 2008/0135017 A1 Jun. 12, 2008

(30) Foreign Application Priority Data

Dec. 8, 2006 (JP) ............................. 2006-332024

(51) Int. Cl.
*F02P 3/04* (2006.01)
(52) U.S. Cl. .................. 123/605; 123/630; 123/406.13; 123/406.14; 123/406.27
(58) Field of Classification Search ............ 123/406.13, 123/406.14, 406.27, 605, 630
See application file for complete search history.

(56) References Cited

U.S. PATENT DOCUMENTS 6,123,057 A * 9/2000 Goras et al. ............ 123/406.27
6,951,201 B2 * 10/2005 Zhu et al. ............... 123/406.27
7,063,079 B2 * 6/2006 Huberts et al. ............... 123/630
2004/0084021 A1 * 5/2004 Zhu et al. ............... 123/406.27
2004/0084035 A1 * 5/2004 Newton ...................... 123/630

FOREIGN PATENT DOCUMENTS

JP            8-128381 A      5/1996
JP         2003314424 A      11/2003
JP         2004156608 A       6/2004

OTHER PUBLICATIONS

Japanese Office Action, dated Aug. 19, 2008.

* cited by examiner

*Primary Examiner*—Erick Solis
(74) *Attorney, Agent, or Firm*—Sughrue Mion, PLLC

(57) ABSTRACT

An ignition device, including: an ignition coil (1) having a primary coil and a secondary coil; a switching element (5) for causing a primary current to be conducted through and shut off from the primary coil of the ignition coil; a waveform shaping circuit (6) for shaping a waveform of an ignition signal transmitted from an outside through a signal line to supply a conduction signal thus obtained to the switching element; ion current detecting means (8, 9) connected to the secondary coil of the ignition coil, for detecting an ion current flowing through the secondary coil; and ion signal generating means (10, 11, 12) for outputting an ion signal, which indicates the ion current detected for a predetermined period after the conduction signal of the waveform shaping circuit has been turned off, to the outside through the signal line while invalidating the conduction signal from the waveform shaping circuit.

13 Claims, 9 Drawing Sheets

IGNITION DEVICE OF IGNITION CONTROL SYSTEM FOR AN INTERNAL COMBUSTION ENGINE

BACKGROUND OF THE INVENTION

1. Field of the Invention

The present invention relates to an ignition control system for an internal combustion engine mounted in, for example, a motor vehicle, and more particularly, to an ignition device of an ignition control system for an internal combustion engine which causes a current to be conducted through and shut off from a primary coil of an ignition coil by means of a switching element to generate a high voltage for ignition in a secondary coil of the ignition coil.

2. Description of the Related Art

In a conventional ignition control system for an internal combustion engine, an ignition device having a coil is provided with a dedicated terminal for outputting a failure diagnosis signal obtained by monitoring an ignition operation, so the failure diagnosis signal is output to an electronic control circuit side through a path different from a path for an ignition signal terminal (e.g., see JP 64-35078 A).

In the above-mentioned structure, however, the necessity for the dedicated terminal for outputting the failure diagnosis signal causes problems such as an increase in the number of parts of an ignition device and an increase in the number of harnesses between the ignition device and the electronic control circuit.

In order to solve those problems, another ignition device for an internal combustion engine is equipped with an electronic control circuit for outputting an ignition signal for controlling an ignition timing, an igniter driven based on the ignition signal from the electronic control circuit, and a failure detecting circuit for detecting a failure signal obtained from a current flowing through a secondary coil of an ignition coil in the igniter and returning the failure signal to the electronic control circuit, and is structured such that the same signal wire is used for the ignition signal and the failure signal. In the aforementioned ignition device for the internal combustion engine, with a view to preventing the ignition signal and the failure signal from being output simultaneously, the ignition signal is kept from being turned ON inside the igniter when the failure signal is output (e.g., see JP 08-128381 A).

In this kind of ignition control system for an internal combustion engine, a failure diagnosis is often carried out from an ion current obtained from a secondary coil of an ignition coil after ignition and explosion. In a device having this construction as well, similar problems such as an increase in the number of parts of the device and an increase in the number of harnesses are caused when the device is provided with a dedicated terminal for outputting a failure diagnosis signal.

Furthermore, in a device for outputting an ion current as a failure diagnosis signal, a leak current flows when soot or the like is generated between electrodes due to the smoldering of an ignition plug, so there is caused a state in which the ion current flows constantly in a fictitious manner. In consequence, the ion current is output even at a timing when an ignition signal is to be supplied, so there is a problem in that the ignition signal cannot be transmitted accurately to a circuit at a subsequent stage.

SUMMARY OF THE INVENTION

It is therefore an object of the present invention to provide an ignition device of an ignition control system for an internal combustion engine having a structure where an ion current is used as a failure diagnosis signal, which makes it possible to supply an ignition signal stably and detect the ion current stably while allowing an ion signal serving as the failure diagnosis signal to be output from the ignition device side to an electronic control unit side without complicating the structure of the ignition device.

According to the present invention, there is provided an ignition device of an ignition control system for an internal combustion engine, including: an ignition coil having a primary coil and a secondary coil; a switching element for causing a primary current to be conducted through and shut off from the primary coil of the ignition coil; a waveform shaping circuit for shaping a waveform of an ignition signal transmitted from an outside through a signal line to supply a conduction signal thus obtained to the switching element; ion current detecting means connected to the secondary coil of the ignition coil, for detecting an ion current flowing through the secondary coil; and ion signal generating means for outputting an ion signal, which indicates the ion current detected for a predetermined period after the conduction signal of the waveform shaping circuit has been turned off, to the outside through the signal line while invalidating the conduction signal from the waveform shaping circuit.

The ignition device of the ignition control system for the internal combustion engine according to the present invention makes it possible to supply an ignition signal stably and detect an ion current stably while allowing an ion signal serving as a failure diagnosis signal to be output without complicating the structure of the ignition device.

DETAILED DESCRIPTION OF THE PREFERRED EMBODIMENTS

First Embodiment

Figure 1:
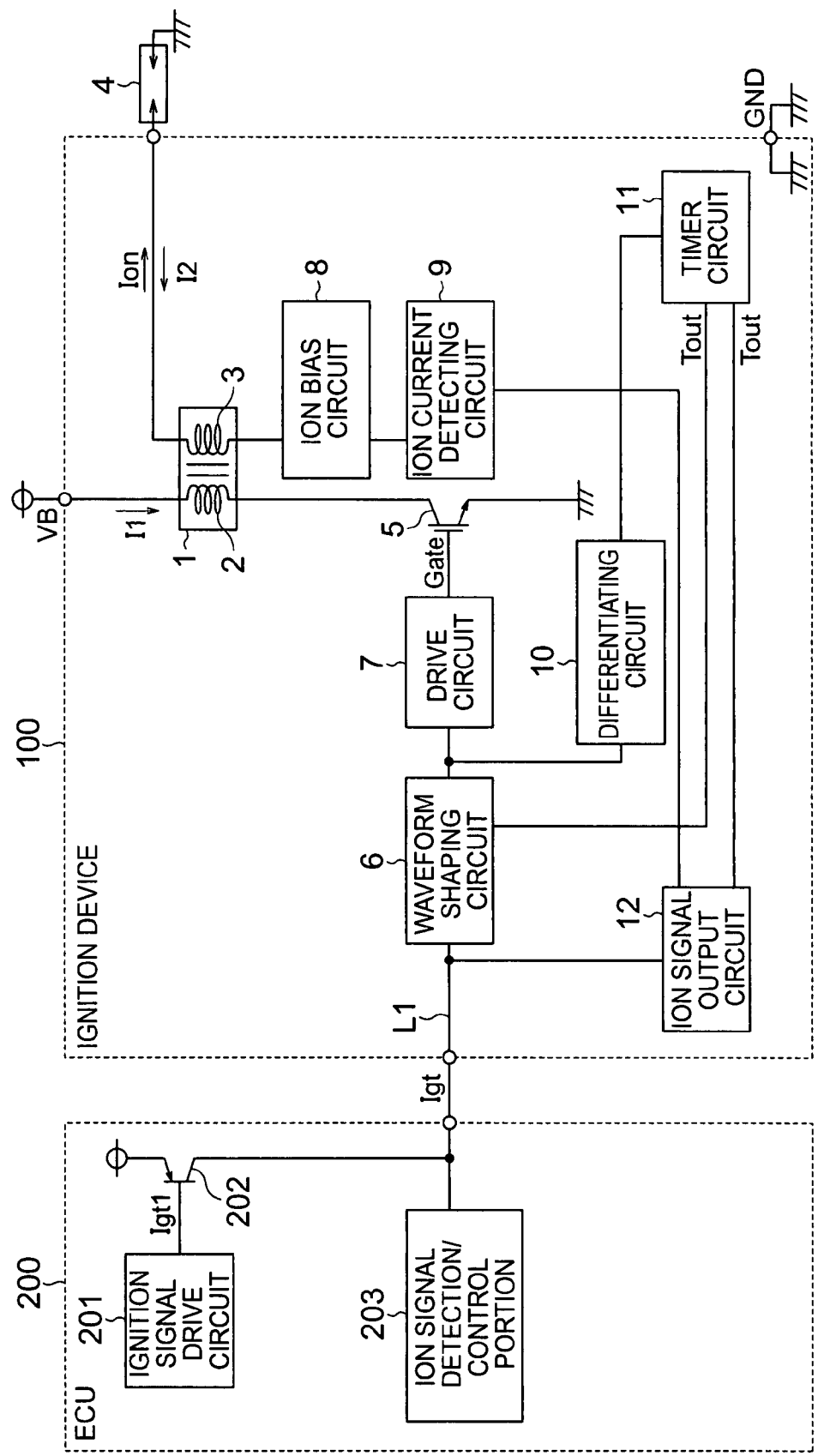
FIG. 1 is a diagram showing the configuration of an ignition control system for an internal combustion engine including an ignition device according to a first embodiment of the present invention.

FIG. 1 is a diagram showing the configuration of an ignition control system for an internal combustion engine including an ignition device according to a first embodiment of the present invention. FIG. 1 shows a circuit for each one of cylinders. This circuit is composed of an ignition device 100 for igniting an ignition plug 4, and an electronic control unit (ECU) 200 including a computer (not shown in particular) for performing ignition control for the ignition device 100.

The ECU 200 is equipped with an ignition signal drive circuit 201 for supplying an ignition signal, a PNP transistor 202 for supplying a signal to a stage subsequent thereto based on the ignition signal output from the ignition signal drive circuit 201, and an ion signal detection/control portion 203 for detecting an ion signal as a failure diagnosis signal from the later-described ignition device 100 side and performing control based on a result of the detection of the ion signal.

The ignition device 100 is equipped with an ignition coil 1 having a primary coil 2 and a secondary coil 3, an ignition signal waveform shaping circuit 6 for supplying a signal to a stage subsequent thereto based on an ignition signal Igt output from an emitter of the PNP transistor 202, a drive circuit 7 for driving the ignition coil 1, and a switching element 5 for causing a current I1 to be conducted through and shut off from the primary coil 2 of the ignition coil 1 based on an output signal from the drive circuit 7. In order to drive the ignition coil 1, the drive circuit 7 transmits a signal to a stage subsequent thereto based on an output signal from the waveform shaping circuit 6 and thereby controls the switching element 5. The output signal from the waveform shaping circuit 6 serves as a conduction signal for causing a current to be conducted through and shut off from the switching element 5.

The ignition coil 1 generates a high voltage for causing the secondary coil 3 to ignite the ignition plug 4. The ignition device 100 is further equipped with an ion bias circuit 8 connected to a low-voltage side of the secondary coil 3 to generate an ion current, an ion current detecting circuit 9 for detecting an ion current generated after ignition to output the detected ion current to a stage subsequent thereto, a differentiating circuit 10 for outputting a pulse signal based on an output signal from the waveform shaping circuit 6, a timer circuit 11 for outputting a pulse of a certain time length with an output from the differentiating circuit 10 regarded as a trigger, and an ion signal output circuit 12 for outputting an ion current signal (ion signal) based on an output from the ion current detecting circuit 9 while receiving an output signal from the timer circuit 11.

The ion signal detection/control portion 203 of the ECU 200 detects and analyzes an ion signal as an output signal from the ion signal output circuit 12.

The ion bias circuit 8 causes an ion current generated after combustion to flow. The ion current detecting circuit 9 supplies an ion current to the ion signal output circuit 12. The differentiating circuit 10 outputs a pulse signal to the timer circuit 11 at a stage subsequent thereto at a moment when an ignition signal is turned OFF. The timer circuit 11 supplies a pulse output of a certain time length to a stage subsequent thereto with an output signal from the differentiating circuit 10 regarded as a trigger. The ion signal output circuit 12 supplies information on the ion current to the ion signal detection/control portion 203 in the ECU 200 while an output signal from the timer circuit 11 is supplied to the ion signal output circuit 12. The ion signal detection/control portion 203 conducts an analysis based on the supplied information, thereby confirming a state of combustion in a combustion chamber (not shown) within each of the cylinders.

Figure 2:
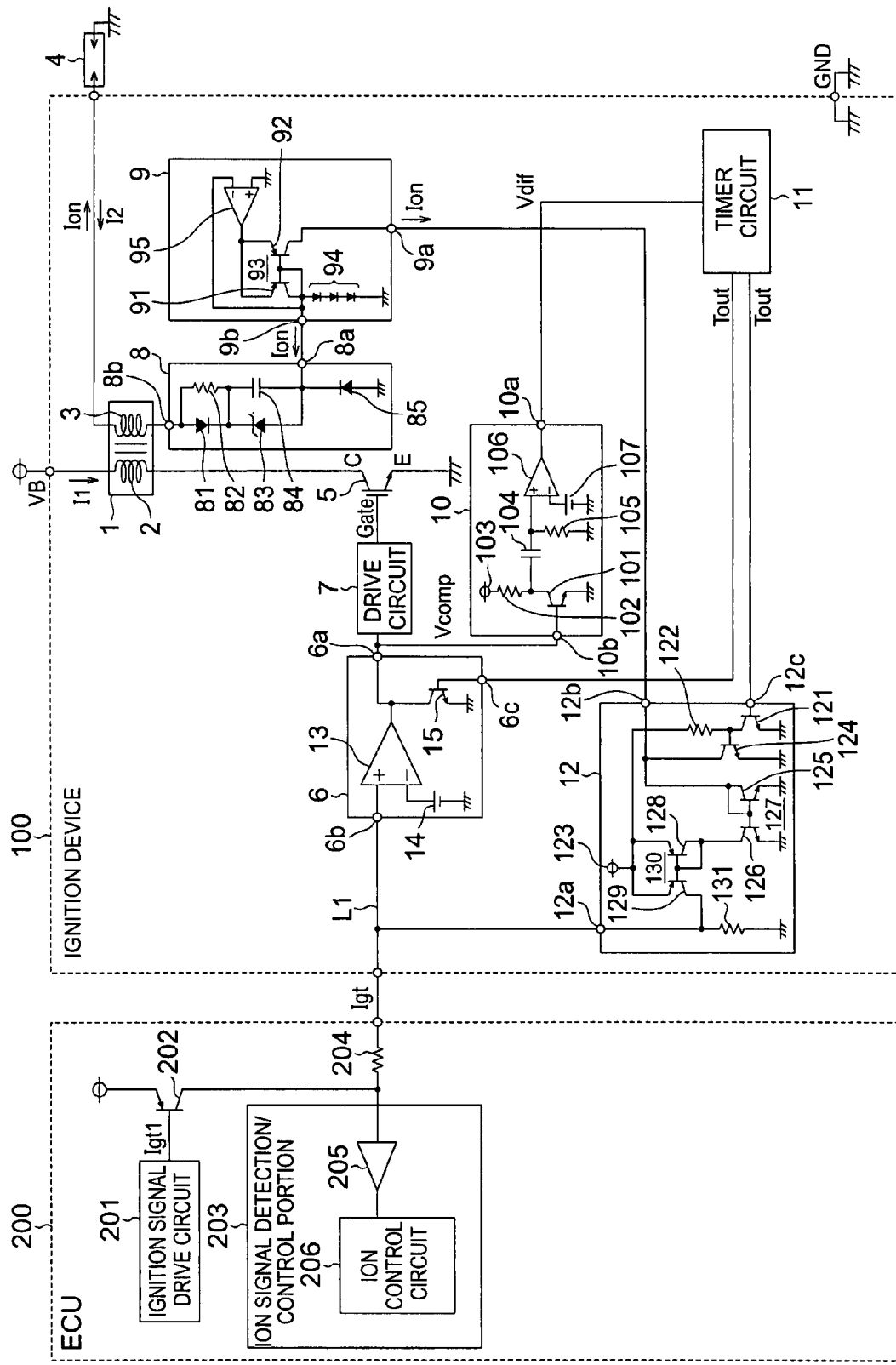
FIG. 2 is a diagram showing an example of the circuitry of respective components of the ignition control system for the internal combustion engine of FIG. 1.

FIG. 2 is a diagram showing an example of the circuitry of respective components of the ignition control system for the internal combustion engine of FIG. 1. The ignition control system for the internal combustion engine according to the first embodiment of the present invention is designed for an internal combustion engine mounted in a motor vehicle. The respective components shown in FIG. 2 are mounted in the motor vehicle. The ignition coil 1, which has the primary coil 2 and the secondary coil 3, is connected to a power supply terminal VB such as an on-vehicle battery (not shown). The on-vehicle battery has a battery voltage of, for example, 12 V. The power supply terminal VB has a terminal voltage of, for example, 12 V. The ignition plug 4 is connected to a high-voltage side of the secondary coil 3. The ignition coil 4 is disposed in the combustion chamber within each of the cylinders. When a fuel such as gasoline is supplied into the combustion chamber, the ignition coil 4 ignites and burns the fuel.

The ECU 200 has the ignition signal drive circuit 201 and the ion signal detection/control portion 203. The ignition signal drive circuit 201 supplies an ignition signal (e.g., rectangular-wave signal) to the waveform shaping circuit 6 via the PNP transistor 202 and a resistor 204.

The waveform shaping circuit 6 has three terminals, namely, an output terminal 6a and input terminals 6b and 6c. The output terminal 6a is connected to the drive circuit 7 and the differentiating circuit 10 at stages subsequent thereto. The input terminal 6b is connected to the ECU 200, and the input terminal 6c is connected to the timer circuit 11.

The internal structure of the waveform shaping circuit 6 will be described. The waveform shaping circuit 6 is composed of a comparator circuit 13, a reference voltage supply 14, and a transistor 15. When the ignition signal Igt is above a voltage Vton set in the reference voltage supply 14, the waveform shaping circuit 6 outputs the ignition signal Igt to the drive circuit 7 to drive the switching element 5. The switching element 5 is designed as, for example, an insulated gate bipolar transistor (IGBT) having a gate terminal connected to the drive circuit 7, a collector terminal connected to the primary coil 2 of the ignition coil 1, and an emitter terminal connected to a reference potential point GND of a vehicle body or the like of the motor vehicle. This reference potential point GND is generally referred to as ground.

The ion bias circuit 8 is connected to the low-voltage side of the secondary coil 3. The ion bias circuit 8 has two terminals, namely, an output terminal 8a and an input terminal 8b. The output terminal 8a is connected to an input terminal 9b of the ion current detecting circuit 9 at a stage subsequent thereto, and the input terminal 8b is connected to the low-voltage side of the secondary coil 3.

The internal structure of the ion bias circuit 8 will be described. The ion bias circuit 8 includes diodes 81 and 85, a resistor 82, a zener diode 83, and a capacitor 84. An anode of the diode 81 and one end of the resistor 82 are connected to the input terminal 8b. A cathode of the diode 81 and the other end of the resistor 82 are both connected to a cathode of the zener diode 83 and one end of the capacitor 84. An anode of the zener diode 83 and the other end of the capacitor 84 are both connected to a cathode of the diode 85 and the output terminal 8a. An anode of the diode 85 is connected to the ground GND. The diode 81 suppresses a secondary voltage generated during the rising of a primary current of the ignition coil 1, thereby preventing erroneous ignition. The resistor 82 ensures a path through which an ion current flows. The zener diode 83 and the capacitor 84 accumulate electric charges due to a voltage generated on a secondary high-voltage side. The diode 85 is used for surge protection.

The ion current detecting circuit 9 has two terminals, namely, an output terminal 9a and the input terminal 9b. The output terminal 9a is connected to an input terminal 12b of the ion signal output circuit 12 at a stage subsequent thereto, and the input terminal 9b is connected to the output terminal 8a of the ion bias circuit 8.

The internal structure of the ion current detecting circuit 9 will be described. The ion current detecting circuit 9 includes a current mirror circuit 93 including two transistors 91 and 92, a diode group 94, and an amplifier circuit 95. A collector and a base of the transistor 91, a base of the transistor 92, and an anode of the diode group 94 are connected to the input terminal 9b. A cathode of the diode group 94 is connected to the ground GND. Emitters of the transistors 91 and 92 are connected to an output terminal of the amplifier circuit 95. An input terminal (+) of the amplifier circuit 95 is connected to the ground GND, and an input terminal (−) of the amplifier circuit 95 is connected to the input terminal 9b. A collector of the transistor 92 is connected to the output terminal 9a.

The differentiating circuit 10 has two terminals, namely, an output terminal 10a and an input terminal 10b. The output terminal 10a is connected to the timer circuit 11 at a stage subsequent thereto, and the input terminal 10b is connected to the output terminal 6a of the waveform shaping circuit 6 and the drive circuit 7.

The internal structure of the differentiating circuit 10 will be described. The differentiating circuit 10 includes a transistor 101, resistors 102 and 105, an internal power supply 103, a capacitor 104, a comparator circuit 106, and a reference voltage supply 107. A base and an emitter of the transistor 101 are connected to the input terminal 10b and the ground GND, respectively. A collector of the transistor 101 is connected to the internal power supply 103 via the resistor 102, and also to one end of the capacitor 104 separately. The internal power supply 103 is a voltage supply stabilized within the differentiating circuit 10. The other end of the capacitor 104 is connected to the ground GND via the resistor 105, and to an input terminal (+) of the comparator circuit 106. An input terminal (−) of the comparator circuit 106 is connected to the reference voltage supply 107, and an output terminal of the comparator circuit 106 is connected to the output terminal 10a.

The timer circuit 11 has three terminals, namely, an input terminal and two output terminals. The input terminal is connected to the differentiating circuit 10. One of the output terminals is connected to an input terminal 12c of the ion signal output circuit 12, and the other output terminal is connected to the input terminal 6c of the waveform shaping circuit 6.

The ion signal output circuit 12 has three terminals, namely, an output terminal 12a and the input terminals 12b and 12c. The output terminal 12a is connected together with the waveform shaping circuit 6 to the ECU 200. The input terminal 12b is connected to the output terminal 9a of the ion current detecting circuit 9, and the input terminal 12c is connected to the timer circuit 11.

The internal structure of the ion signal output circuit 12 will be described. The ion signal output circuit 12 is constituted by a circuit including transistors 121 and 124, a resistor 122, an internal power supply 123, a current mirror circuit 127 including two transistors 125 and 126, a current mirror circuit 130 including two transistors 128 and 129, and a resistor 131.

A base of the transistor 121 is connected to the input terminal 12c, and a collector of the transistor 121 is connected to a base of the transistor 124 and to the internal power supply 123 via the resistor 122 respectively. As is the case with the internal power supply 103, the internal power supply 123 is a voltage supply stabilized within the ion signal output circuit 12. A collector of the transistor 124 is connected to the input terminal 12b and a collector of the transistor 125.

A base and a collector of the transistor 125 are connected to a base of the transistor 126. A collector of the transistor 126 is connected to a collector of the transistor 128. A base and a collector of the transistor 128 are connected to a base of the transistor 129. A collector of the transistor 129 is connected to one end of the resistor 131 and the output terminal 12a. Emitters of the transistors 128 and 129 are connected to the internal power supply 123. The other end of the resistor 131 and emitters of the transistors 121, 124, 125, and 126 are all connected to the ground GND.

The internal structure of the ion signal detection/control portion 203 will be described. The ion signal detection/control portion 203 includes a buffer circuit 205 and an ion control circuit 206. An input terminal of the buffer circuit 205 is connected to a collector of the transistor 202, and to the input terminal 6b of the waveform shaping circuit 6 and the output terminal 12a of the ion signal output circuit 12 via the resistor 204, respectively. An output terminal of the buffer circuit 205 is connected to the ion control circuit 206.

The transistors 91, 92, 128, 129, and 202 are designed as PNP transistors, and the transistors 15, 101, 121, 124, 125, and 126 are designed as NPN transistors.

The ion bias circuit 8 and the ion current detecting circuit 9 constitute an ion current detecting unit, and the differentiating circuit 10, the timer circuit 11, and the ion signal output circuit 12 constitute an ion signal generating unit.

Figure 3:
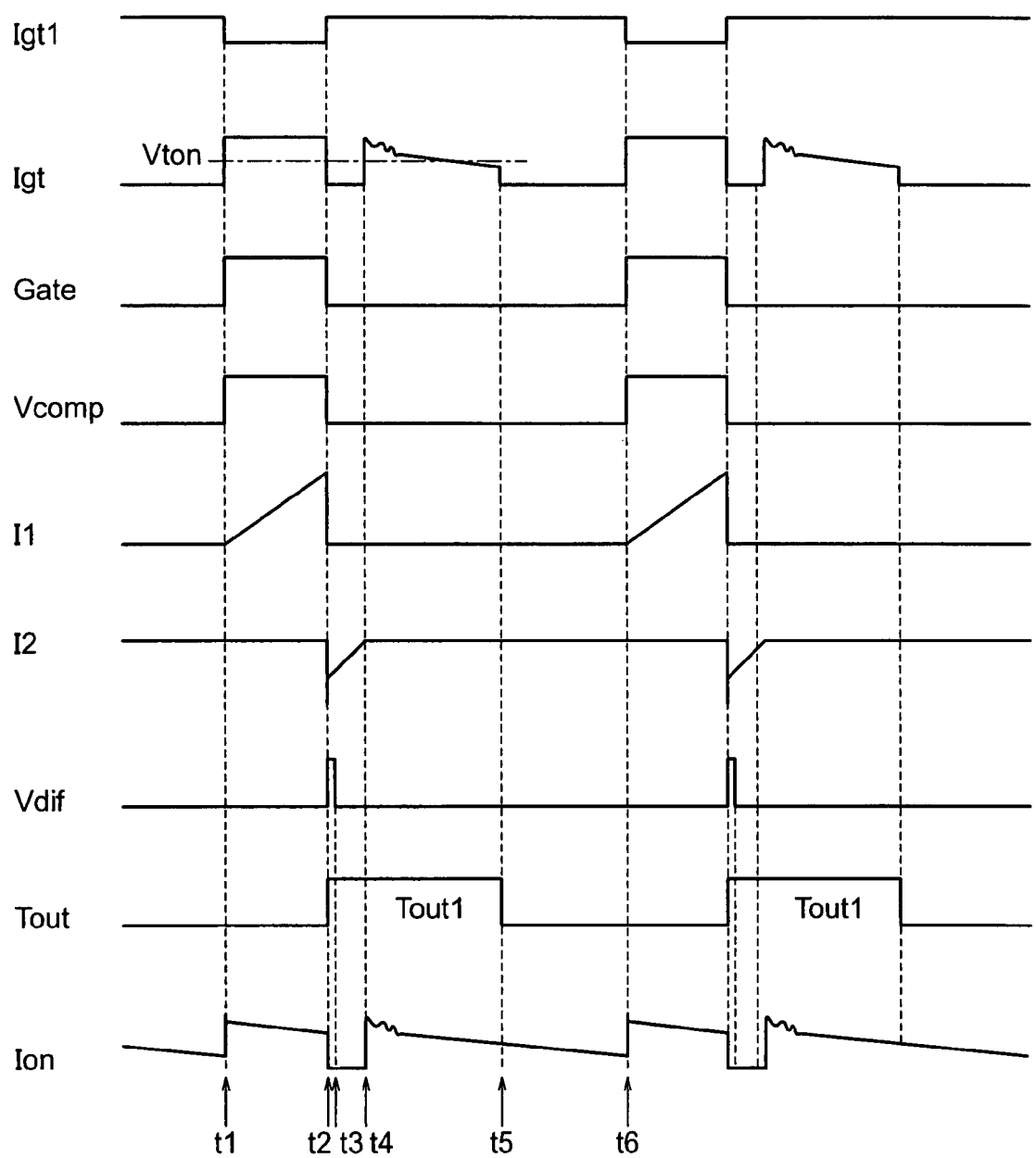
FIG. 3 is a timing chart showing the waveforms of signals from the respective components of the ignition control system of FIG. 2.

FIG. 3 is a timing chart showing the waveforms of signals from the respective components of FIG. 2. The operation of the ignition control system will be described hereinafter with reference to FIG. 3. When an ignition signal is supplied from the microcomputer in the ECU 200 to the ignition signal drive circuit 201 at a time point t1, the ignition signal drive circuit 201 supplies an ignition command signal Igt1 of "L" level to a gate of the transistor 202. Thus, the transistor 202 is turned ON, so an ignition signal Itg of "H" level is supplied to the waveform shaping circuit 6 via the resistor 204 and a signal line L1. When the ignition signal Itg exceeds the voltage Vton of the reference voltage supply 14 (i.e., input signal is ON), a signal Vcomp of "H" level is supplied from the comparator circuit 13 in the waveform shaping circuit 6 to the drive circuit 7 and the differentiating circuit 10. The drive circuit 7, which has received the signal of "H" level as a conduction signal, supplies a Gate signal of "H" level to a gate as the input terminal of the switching element 5. Thus, the switching element 5 is turned ON, so the primary current I1 starts flowing through the primary coil 2 of the ignition coil 1.

When there is a leak current due to the smoldering of the ignition plug 4, an ion current Ion continues to flow constantly except when an electric discharge of a secondary current I2 occurs.

After that, when no more ignition command signal is supplied to the ignition signal drive circuit 201 and the ignition command signal Igt1 reassumes "H" level at a time point t2, the transistor 202 is turned OFF. Thus, the ignition signal Igt transmitted to the waveform shaping circuit 6 assumes "L" level, and the signal Vcomp output from the waveform shaping circuit 6 assumes "L" level. The differentiating circuit 10 receives the signal Vcomp, differentiates this signal by means of a differentiating circuit composed of the capacitor 104 and the resistor 105, and then shapes the waveform of the differentiated signal by means of a waveform shaping circuit composed of the comparator circuit 106 and the reference voltage supply 107. Thus, the differentiating circuit 10 outputs a signal Vdif pulsed between the time point t2 and a time point t3.

When the signal Vcomp assumes "H" level, the signal Gate output from the drive circuit 7 thereby assumes "L" level. At a moment when the switching element 5 is turned OFF as a result, the primary current I1 flowing through the primary coil 2 is shut off, so a high voltage is generated at a collector C of the switching element 5. The energy of this high voltage is subjected to conversion and then transmitted to the secondary coil 3, so a negative voltage is induced on the high-voltage side of the secondary coil 3. At this moment, a positive voltage is applied to the low-voltage side of the secondary coil 3. The voltage is applied to both ends of the zener diode 83 via the diode 81, so the capacitor 84 is charged with electric charges. When a negative voltage sufficient to cause dielectric breakdown in a gap of the ignition plug 4 is generated, an electric discharge occurs in the ignition plug 4. At this moment, after a delay from the time point t2, the secondary current I2 flows from the ignition plug 4 side to the secondary coil 3, and then to the ground GND via the diode 81, the zener diode 83, and the diode group 94 (although shown schematically in FIG. 3).

At a time point t4 when the electric discharge ends, the ion current Ion flows to the secondary coil 3 via the resistor 82 due to a voltage applied to the capacitor 84. At this moment, the transistor 91 is turned ON, so the current mirror circuit 93 operates. The amplifier circuit 95 adjusts the potentials at the emitters of the transistors 91 and 92 such that the potential at the collector of the transistor 91 becomes 0. The transistor 92 of the current mirror circuit 93 pours out the collector current Ion equivalent to an ion current that has flowed via the transistor 91. The current Ion thus output is supplied to the ion signal output circuit 12 at a stage subsequent to the transistor 92.

Upon receiving the signal Vdif as a pulse signal output from the differentiating circuit 10, the timer circuit 11 outputs a pulse Tout1, which lasts for a predetermined time set in advance from the time point t2 to a time point t5, as an output signal Tout. The output time of the pulse Tout1 is set to a level below a value obtained by subtracting from a shortest ignition cycle (Tmin) realized in practical use a conduction time (Ton) in this cycle, as expressed by the following expressions.

$Tout1 = t5 - t2 \leq Tmin - Ton$ $Tmin = t6 - t1 \ Ton = t2 - t1$

The ion signal output circuit 12 receives the signal Tout from the timer circuit 11, and the transistor 121 is held ON for the duration of the pulse Tout1, namely, while the signal Tout is at "H" level. Thus, the current flowing via the internal power supply 123 and the resistor 122 flows to the collector of the transistor 121, so the transistor 124 is turned OFF. While the transistor 124 is held OFF, namely, while the pulse Tout1 is supplied from the timer circuit 11, the current Ion equivalent to the ion current supplied from the ion current detecting circuit 9 flows via the transistor 125, so the current mirror circuit 127 is turned ON.

The transistor 126 of the current mirror circuit 127 draws in the current Ion equivalent to the ion current that has flowed via the transistor 125. The current Ion flows through the transistor 128, so the current mirror circuit 130 is turned ON. The current Ion equivalent to the ion current flows through the transistor 129 and is then supplied to the resistor 131, so a difference in potential is generated. The current Ion equivalent to the ion current may also be amplified by changing, for example, the ratio in size or quantity between the transistors 128 and 129 of the current mirror circuit 130.

Due to the difference in potential generated in the resistor 131, a voltage corresponding to the current Ion equivalent to the ion current is generated in the signal line L1 connecting the ion signal detection/control portion 203 to the waveform shaping circuit 6. Thus, the ion current can be confirmed by reading a signal of the voltage as an ion signal in the ion control circuit 206 via the buffer circuit 205 within the ion signal detection/control portion 203.

Then at the time point t5, the signal Tout output from the timer circuit 11 assumes "L" level and the transistor 121 of the ion signal output circuit 12 is turned OFF, so the transistor 124 is turned ON. Thus, the current Ion equivalent to the ion current flows through the transistor 124, so the current mirror circuit 127 is turned OFF and hence stops supplying a signal to a stage subsequent thereto. Thus, the current Ion equivalent to the ion current, namely, the ion signal is not output to the signal line L1 until another ignition signal is supplied.

During a period when the ion current indicated by the pulse Tout1 is detected, namely, when the signal Tout output from the timer circuit 11 is at "H" level, the transistor 15 is held ON in the waveform shaping circuit 6, so the output of the comparator circuit 13 is held at "L" level. During this period, therefore, a conduction signal for conducting a current through the switching element 5 is blocked and hence not output from the waveform shaping circuit 6.

Figure 4:
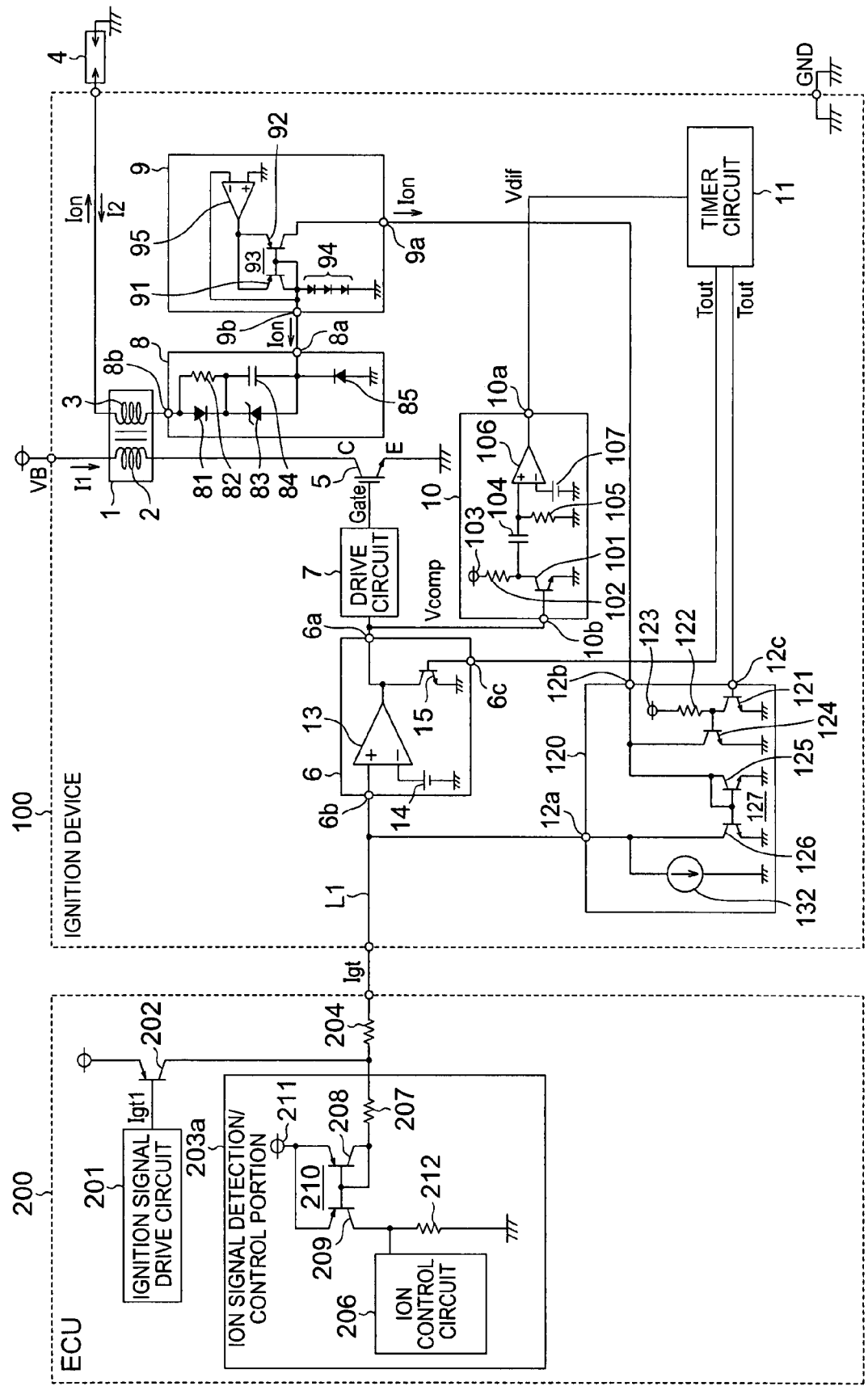
FIG. 4 is a diagram showing another example of the circuitry of the respective components of the ignition control system for the internal combustion engine of FIG. 1.

FIG. 4 is a diagram showing another example of the circuitry of the respective components of the ignition control system for the internal combustion engine of FIG. 1. FIG. 4 is different from FIG. 2 in that the ion signal output circuit 12 and the ion signal detection/control portion 203 are replaced by an ion signal output circuit 120 and an ion signal detection/control portion 203*a*, respectively. FIG. 4 is basically identical to FIG. 2 in other details. In FIG. 4, the same reference symbols as in FIG. 2 are used to denote the components identical or equivalent to those of FIG. 2, respectively.

The internal structure of the ion signal output circuit 120 will be described. In the ion signal output circuit 120, the components 121 to 126 are the same as those of FIG. 2, respectively. The collector of the transistor 126 is connected to a constant current source 132 and the output terminal 12*a*.

The internal structure of the ion signal detection/control portion 203*a* will be described. The ion signal detection/control portion 203*a* includes resistors 207 and 212, a current mirror circuit 210 including transistors 208 and 209 designed as PNP transistors, an internal power supply 211, and the ion control circuit 206. A collector and a base of the transistor 208 and a base of the transistor 209 are connected to a collector of the transistor 202 and the resistor 204 via the resistor 207. Emitters of the transistors 208 and 209 are connected to the internal power supply 211. The internal power supply 211 is a stabilized voltage supply. A collector of the transistor 209 is connected to one end of the resistor 212 and the ion control circuit 206. The other end of the resistor 212 is connected to the ground GND.

In detecting an ion current, the current Ion equivalent to the ion current and a current flowing through the constant current source 132 flow through the transistor 208 via the resistor 204 in the ECU 200 and the resistor 207 in the ion signal detection/control portion 203*a*, so the current mirror circuit 210 is turned ON. A collector current, which is equivalent to a current as a sum of the current equivalent to the ion current which has flowed through the transistor 208 and a constant current, flows through the transistor 209 of the current mirror circuit 210, so a difference in potential is generated in the resistor 212. The ion current can be confirmed by acquiring this voltage as an ion signal in the ion control circuit 206 and subtracting from the voltage a difference in potential caused due to the constantly flowing constant current generated by the constant current source 132.

The ion signal detection/control portion 203a and the ion signal output circuit 120 of FIG. 4 transmit and receive signals through electric current and hence are unsusceptible to the influence of fluctuations in the potential on the ground GND.

In the first embodiment of the present invention, as described above, the ion current is detected for the predetermined time obtained from the timer circuit 11 with the signal obtained from the ignition signal regarded as a trigger, using the ion current detecting unit (8, 9) and the ion signal generating unit (10, 11, 12) including the differentiating circuit 10 and the timer circuit 11. It is therefore possible to supply the ignition signal stably and detect the ion current stably. As a result, it is possible to perform control with high reliability.

Second Embodiment

Figure 5:
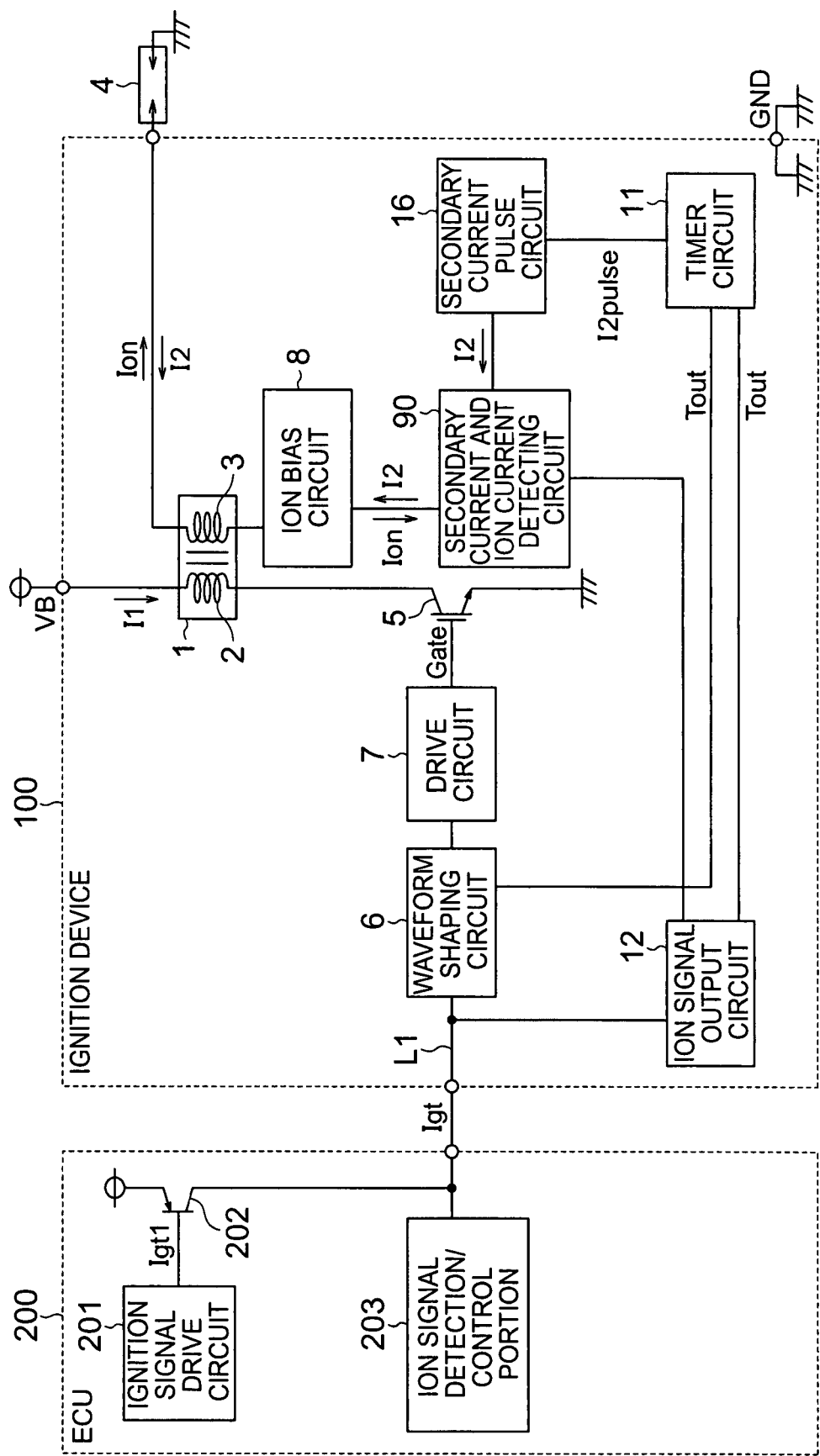
FIG. 5 is a diagram showing the configuration of an ignition control system for an internal combustion engine including an ignition device according to a second embodiment of the present invention.

FIG. 5 is a diagram showing the configuration of an ignition control system for an internal combustion engine including an ignition device according to a second embodiment of the present invention. The ignition control system of FIG. 5 is obtained by eliminating the differentiating circuit 10, replacing the ion current detecting circuit 9 with a secondary current and ion current detecting circuit 90, and adding a secondary current pulse circuit 16 in the ignition control system shown in FIG. 1.

Figure 6:
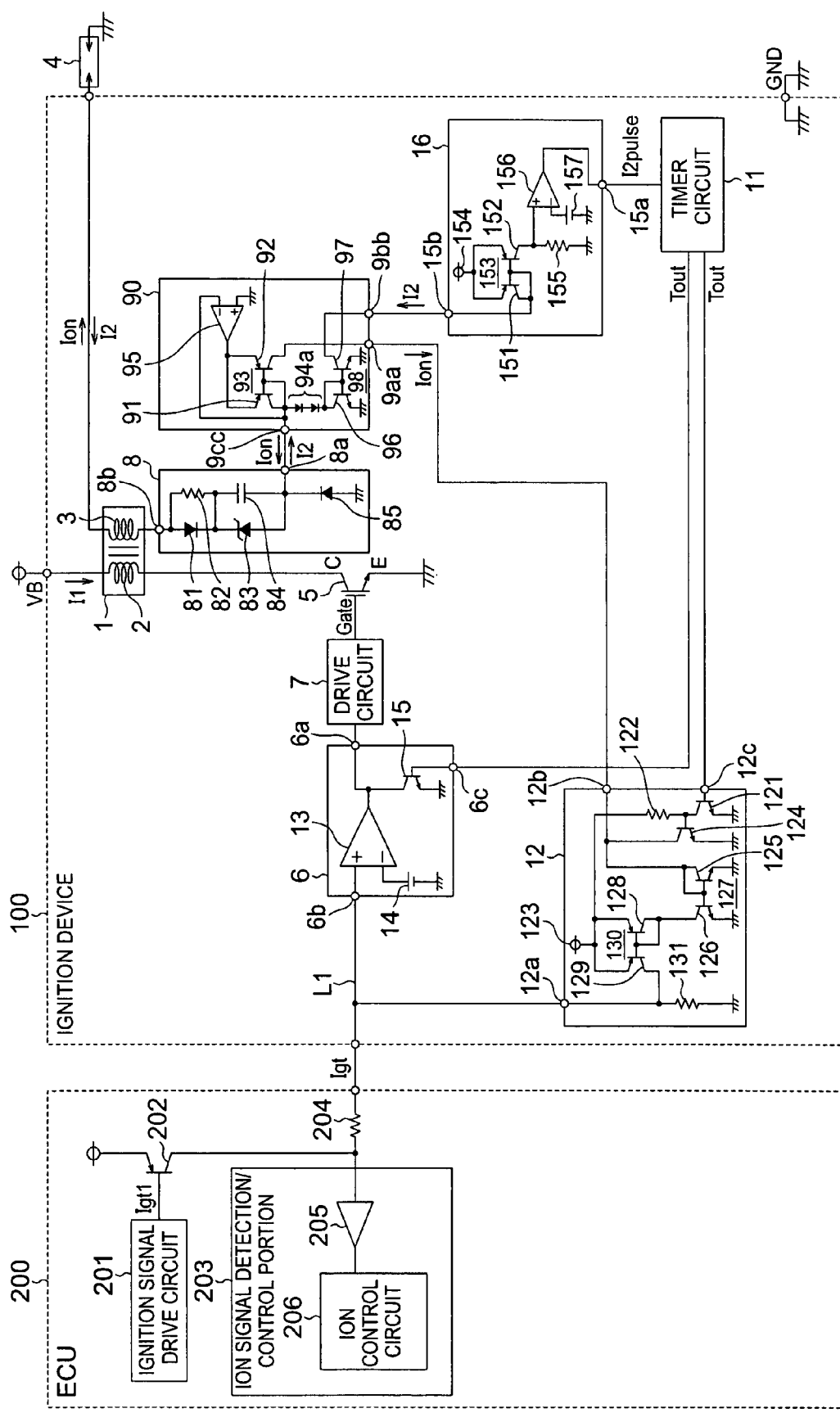
FIG. 6 is a diagram showing an example of the circuitry of respective components of the ignition control system for the internal combustion engine of FIG. 5.

FIG. 6 is a diagram showing an example of the circuitry of respective components of the ignition control system for the internal combustion engine of FIG. 5. In this ignition control system, the secondary current and ion current detecting circuit 90 and the secondary current pulse circuit 16 are used. The second embodiment of the present invention is basically identical to the first embodiment of the present invention in other configurational details. In the second embodiment of the present invention, therefore, the same reference symbols are used to denote the components identical or equivalent to those of the first embodiment of the present invention, respectively. The description of those components will be omitted.

The secondary current and ion current detecting circuit 90 is designed to have three terminals, namely, terminals 9aa, 9bb, and 9cc. The terminal 9aa is connected to the terminal 12b of the ion signal output circuit 12 at a stage subsequent thereto. The terminal 9bb is connected to a terminal 15b of the secondary current pulse circuit 16 at a stage subsequent thereto. The terminal 9cc is connected to the terminal 8a of the ion bias circuit 8.

The internal structure of the secondary current and ion current detecting circuit 90 will be described. The secondary current and ion current detecting circuit 90 includes a current mirror circuit 93 including two transistors 91 and 92 designed as PNP transistors, respectively, a diode group 94a, an amplifier circuit 95, and a current mirror circuit 98 including two transistors 96 and 97 designed as NPN transistors, respectively.

The secondary current and ion current detecting circuit 90 will be described. The collector and the base of the transistor 91, the base of the transistor 92, and an anode of the diode group 94a are connected to the terminal 9cc. The anode of the diode group 94a is connected to a collector and a base of the transistor 96 and a base of the transistor 97. The emitters of the transistors 91 and 92 are connected to the output terminal of the amplifier circuit 95. The input terminal (+) of the amplifier circuit 95 is connected to the ground GND, and the input terminal (−) of the amplifier circuit 95 is connected to the terminal 9cc. Emitters of the transistors 96 and 97 are connected to the ground GND. The collector of the transistor 92 is connected to the terminal 9aa. A collector of the transistor 97 is connected to the output terminal 9bb.

The secondary current pulse circuit 16 has two terminals, namely, a terminal 15a and the input terminal 15b. The terminal 15a is connected to the timer circuit 11, and the terminal 15b is connected to the terminal 9bb of the secondary current and ion current detecting circuit 90.

The internal structure of the secondary current pulse circuit 16 will be described. The secondary current pulse circuit 16 includes a current mirror circuit 153 including two transistors 151 and 152 designed as PNP transistors, respectively, an internal power supply 154, a resistor 155, a comparator circuit 156, and a reference voltage supply 157. A collector and a base of the transistor 151 and a base of the transistor 152 are connected to the terminal 15b. Emitters of the transistors 151 and 152 are connected to the internal power supply 154. The internal power supply 154 is a power supply stabilized within the secondary current pulse circuit 16. A collector of the transistor 152 is connected to one end of the resistor 155 and an input terminal (+) of the comparator circuit 156. The other end of the resistor 155 is connected to the ground GND. An input terminal (−) of the comparator circuit 156 is connected to the reference voltage supply 157. An output terminal of the comparator circuit 156 is connected to the terminal 15a.

The ion bias circuit 8 and the secondary current and ion current detecting circuit 90 constitute the secondary current and ion current detecting unit. The timer circuit 11, the ion signal output circuit 12, and the secondary current pulse circuit 16 constitute the ion signal generating unit.

Figure 7:
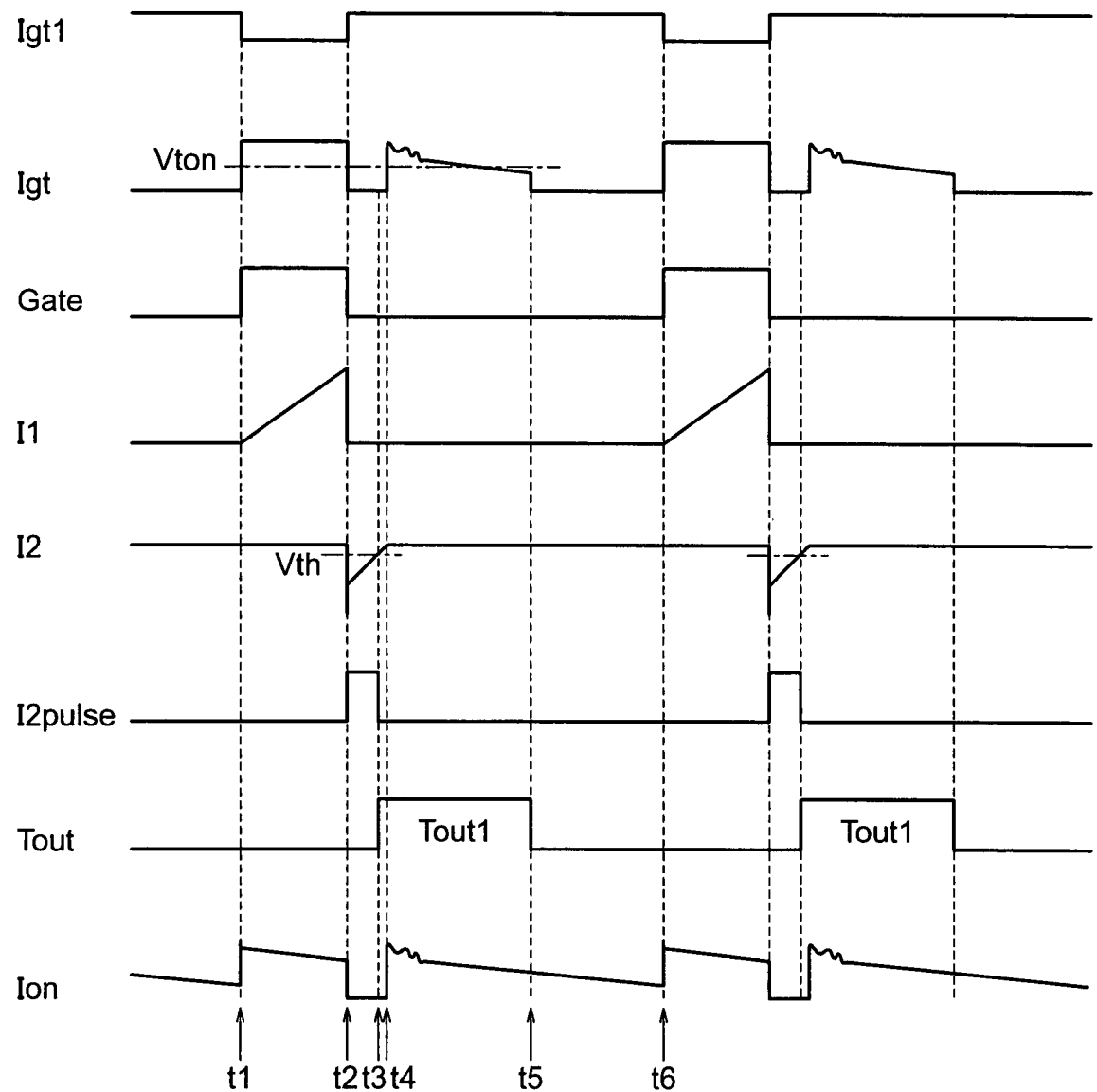
FIG. 7 is a timing chart showing the waveforms of signals from the respective components of the ignition control system of FIG. 6.

FIG. 7 is a timing chart showing the waveforms of signals from the respective components of FIG. 6. The operation of the ignition control system will be described hereinafter with reference to FIG. 7. When an ignition signal is supplied from the microcomputer in the ECU 200 to the ignition signal drive circuit 201 at the time point t1, the ignition signal drive circuit 201 supplies the ignition command signal Igt1 of "L" level to the gate of the transistor 202. Thus, the transistor 202 is turned ON, so the ignition signal Itg of "H" level is supplied to the waveform shaping circuit 6 via the resistor 204 and the signal line L1. When the ignition signal Itg exceeds the voltage Vton of the reference voltage supply 14 (i.e., input signal is ON), a signal of "H" level is supplied from the comparator circuit 13 in the waveform shaping circuit 6 to the drive circuit 7. The drive circuit 7, which has received the signal of "H" level as a conduction signal, supplies a Gate signal of "H" level to the gate as the input terminal of the switching element 5. Thus, the switching element 5 is turned ON, so the primary current I1 starts flowing through the primary coil 2 of the ignition coil 1.

After that, when no more ignition command signal is supplied to the ignition signal drive circuit 201 and the ignition command signal Igt1 reassumes "H" level at the time point t2, the transistor 202 is turned OFF. Thus, at a moment when the signal Gate output from the drive circuit 7 assumes "L" level and the switching element 5 is turned OFF, the primary current I1 flowing through the primary coil 2 is shut off, so a high voltage is generated in the collector C of the switching element 5. The energy of this high voltage is subjected to conversion and then transferred to the secondary coil 3, so a negative voltage is induced on the high-voltage side of the secondary coil 3. At this moment, a positive voltage is applied to the low-voltage side of the secondary coil 3. The voltage is applied to both the ends of the zener diode 83 via the diode 81, so the capacitor 84 is charged with electric charges. When a negative voltage sufficient to cause dielectric breakdown in a gap of the ignition plug 4 is generated, an electric discharge occurs in the ignition plug 4. At this moment, after a delay from the time point t2, the secondary current I2 flows from the ignition plug 4 side to the secondary coil 3, and then to the ground GND via the diode 81, the zener diode 83, the diode group 94a, and the transistor 96 (although shown schematically in FIG. 7). The transistor 96 is turned ON when the secondary current I2 is conducted therethrough, so the current mirror circuit 98 operates.

The transistor 97 of the current mirror circuit 98 draws in the collector current I2 equivalent to the secondary current that has flowed via the transistor 96. The collector current I2 equivalent to the secondary current flows through the transistor 151 of the secondary current pulse circuit 16 as well, so the current mirror circuit 153 operates. The collector current equivalent to the secondary current flows through the transistor 152 as well, so a difference in potential is generated between both the ends of the resistor 155. When the voltage at the input terminal (+) of the comparator circuit 156 exceeds a voltage Vth set in the reference voltage supply 157, the comparator circuit 156 is thereby turned ON, so the output therefrom assumes "H" level.

The secondary current I2 decreases as the electric discharge proceeds, and the voltage at the input terminal (+) of the comparator circuit 156 becomes equal to or lower than the voltage Vth, so the output from the comparator circuit 156 assumes "L" level at the time point t3. In response to the falling of a pulse I2pulse as the output from the comparator circuit 156, the timer circuit 11 outputs the pulse Tout1, which lasts for a predetermined time from the time point t3 to the time point t5.

At the time point t4 when the electric discharge ends, the ion current Ion flows to the secondary coil 3 via the resistor 82 due to a voltage applied to the capacitor 84. At this moment, the transistor 91 is turned ON, so the current mirror circuit 93 operates. The amplifier circuit 95 adjusts the potentials of the emitters of the transistors 91 and 92 such that the potential at the collector of the transistor 91 becomes 0. The transistor 92 of the current mirror circuit 93 pours out the collector current Ion equivalent to the ion current that has flowed via the transistor 91. The current Ion thus output is supplied to the ion signal output circuit 12 at the stage subsequent to the transistor 92.

The ion signal output circuit 12 receives the signal Tout from the timer circuit 11, and the transistor 121 is held ON for the duration of the pulse Tout1, namely, while the signal Tout is at "H" level. Thus, the current flowing via the internal power supply 123 and the resistor 122 flows to the collector of the transistor 121, so the transistor 124 is turned OFF. While the transistor 124 is held OFF, namely, while the pulse Tout1 is supplied from the timer circuit 11, the current Ion equivalent to the ion current supplied from the ion current detecting circuit 90 flows via the transistor 125, so the current mirror circuit 127 is turned ON.

The transistor 126 of the current mirror circuit 127 draws in the collector current Ion equivalent to the ion current that has flowed via the transistor 125. The current Ion flows through the transistor 128, so the current mirror circuit 130 is turned ON. The current Ion equivalent to the ion current flows through the transistor 129 and is then supplied to the resistor 131, so a difference in potential is generated. The current Ion equivalent to the ion current may also be amplified by changing, for example, the ratio in size or quantity between the transistors 128 and 129 of the current mirror circuit 130.

Due to the difference in potential generated in the resistor 131, a voltage corresponding to the current Ion equivalent to the ion current is generated in the signal line L1 connecting the ion signal detection/control portion 203 to the waveform shaping circuit 6. Thus, the ion current can be confirmed by reading a signal of the voltage as an ion signal in the ion control circuit 206 via the buffer circuit 205 within the ion signal detection/control portion 203.

Then at the time point t5, the signal Tout output from the timer circuit 11 assumes "L" level and the transistor 121 of the ion signal output circuit 12 is turned OFF, so the transistor 124 is turned ON. Thus, the current Ion equivalent to the ion current flows through the transistor 124, so the current mirror circuit 127 is turned OFF and hence stops supplying a signal to the stage subsequent thereto. Thus, the current Ion equivalent to the ion current, namely, the ion signal is not output to the signal line L1 until another ignition signal is supplied.

In the ignition control system shown in FIG. 6, the ion signal output circuit 12 and the ion signal detection/control portion 203 may also be replaced respectively by the ion signal output circuit 120 and the ion signal detection/control portion 203a according to the foregoing first embodiment of the present invention shown in FIG. 4. The configuration and operation of those components have been described in the foregoing first embodiment of the present invention and hence will not be described below.

In the second embodiment of the present invention, as described above, the ion current is detected for the predetermined time obtained from the timer circuit 11 with the signal obtained from the secondary current regarded as a trigger, using the secondary current and ion current detecting unit (8, 90) for detecting the secondary current and the ion current and the ion signal generating unit (11, 12, 16) including the secondary current pulse circuit 16, the timer circuit 11, and the ion signal output circuit 12. It is therefore possible to supply the ignition signal stably and detect the ion current stably without being influenced by fluctuations in voltage upon conduction/shutoff of the primary current through/from the ignition coil or by the leak resulting from the smoldering of the ignition plug caused owing to the detection of the ion current for a certain time length. As a result, it is possible to perform control with high reliability.

The necessity for a switch for making a changeover in detecting an ion current or a secondary current is eliminated by using the secondary current and ion current detecting circuit 90. As a result, a simplification of the circuitry can be achieved.

Third Embodiment

Figure 8:
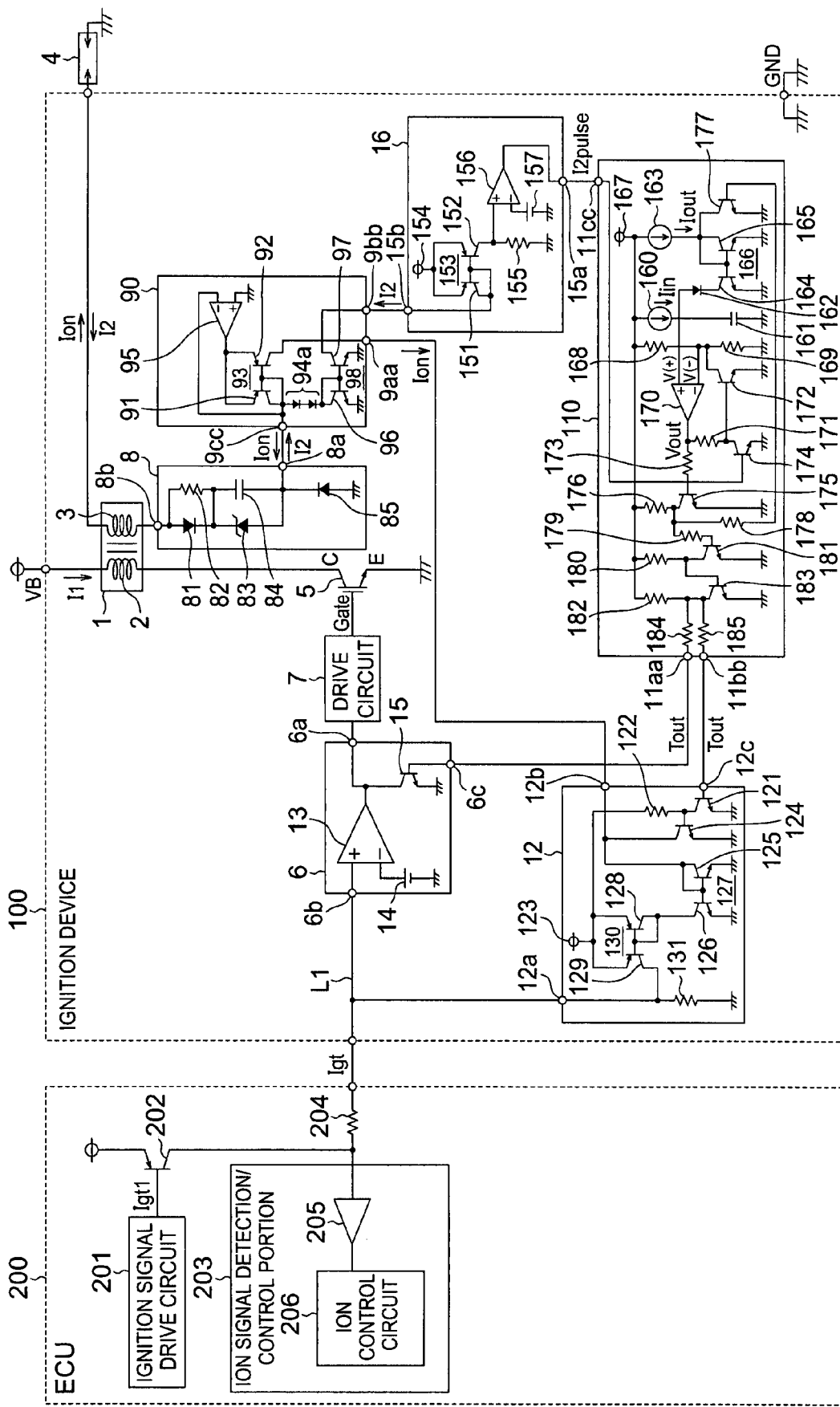
FIG. 8 is a diagram showing an example of the circuitry of an ignition control system for an internal combustion engine including an ignition device according to a third embodiment of the present invention.

FIG. 8 is a diagram showing the configuration of an ignition control system for an internal combustion engine including an ignition device according to a third embodiment of the present invention. The ignition control system of FIG. 8 is obtained by replacing the timer circuit 11 with a timer circuit 110 in the ignition control system shown in FIG. 6. The third embodiment of the present invention is basically identical to the second embodiment of the present invention in other configurational details. In the third embodiment of the present invention, therefore, the same reference symbols are used to denote the components identical or equivalent to those of the second embodiment of the present invention respectively. The description of those components will be omitted.

The timer circuit 110 has three terminals, namely, output terminals 11aa and 11bb and an input terminal 11cc. The output terminal 11aa is connected to the input terminal 6c of the waveform shaping circuit 6 at a stage subsequent thereto. The output terminal 11bb is connected to the input terminal 12c of the ion signal output circuit 12 at a stage subsequent thereto. The input terminal 11aa is connected to the output terminal 15a of the secondary current pulse circuit 16.

The internal structure of the timer circuit 110 will be described. The timer circuit 110 is composed of two constant current sources 160 and 163, a capacitor 161, a diode 162, a current mirror circuit 166 including NPN transistors 164 and 165, an internal power supply 167, resistors 168, 169, 171, 173, 176, 178, 179, 180, 182, 184, and 185, a comparator circuit 170, and a circuit including NPN transistors 172, 174, 175, 177, 181, and 183.

The timer circuit 110 will be described. One end of the constant current source 160, the capacitor 161, an anode of the diode 162, and an input terminal (+) of the comparator circuit 170 are connected to one another. A cathode of the diode 162 is connected to a collector of the transistor 164. A base of the transistor 164 is connected to a base and a collector of the transistor 165, one end of the constant current source 163, and a collector of the transistor 177, respectively. The other end of the constant current source 160 and the other end of the constant current source 163 are connected to the internal power supply 167. The internal power supply 167 is a power supply stabilized within the timer circuit 110.

Emitters of the transistors 164, 165, and 177 are connected to the ground GND. An input terminal (−) of the comparator circuit 170 is connected to one end of the resistor 168, one end of the resistor 169, and a collector of the transistor 172. The other end of the resistor 168 is connected to the internal power supply 167, and the other end of the resistor 169 and an emitter of the transistor 172 are connected to the ground GND. An output terminal of the comparator circuit 170 is connected to a base of the transistor 172 and a collector of the transistor 174 via the resistor 171, and to a base of the transistor 175 via the resistor 173. A collector of the transistor 175 is connected to the internal power supply 167 via the resistor 176, to a base of the transistor 177 via the resistor 178, and to a base of the transistor 181 via the resistor 179.

A collector of the transistor 181 is connected to the internal power supply 167 and a base of the transistor 183 via the resistor 180. A collector of the transistor 183 is connected to the internal power supply 167 via the resistor 182, to the output terminal 11aa via the resistor 184, and to the output terminal 11bb via the resistor 185. Emitters of the transistors 174, 175, 181, and 183 are connected to the ground GND.

The ion bias circuit 8 and the secondary current and ion current detecting circuit 90 constitute the secondary current and ion current detecting unit. The timer circuit 110, the ion signal output circuit 12, and the secondary current pulse circuit 16 constitute the ion signal generating unit.

Figure 9:
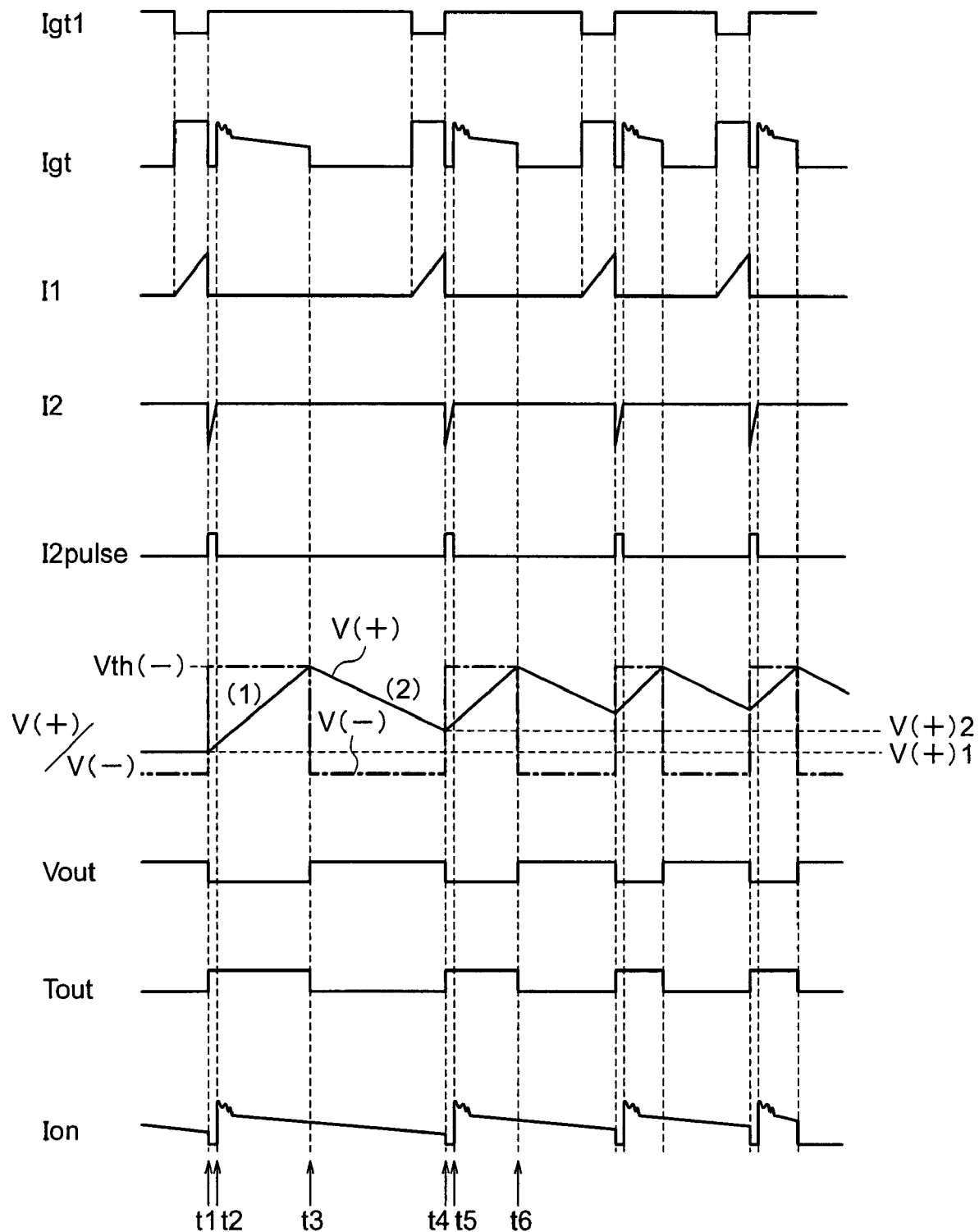
FIG. 9 is a timing chart showing the waveforms of signals from respective components of the ignition control system of FIG. 8.

FIG. 9 is a timing chart showing the waveforms of signals from the respective components of FIG. 8. The operation of the ignition control system will be described hereinafter with reference to FIG. 9. The operation performed until a secondary current flows is the same as in the second embodiment of the present invention and hence will not be described below. In the timer circuit 110, when power is supplied from the internal power supply 167 through the supply of power from the power supply terminal VB, the potential (hereinafter denoted by V(+)) at the input terminal (+) of the comparator circuit 170 is applied to the capacitor 161 through the constant current source 160 (current Iin), so the capacitor 161 is at a high voltage. The voltage (hereinafter denoted by V(−)) generated at the input terminal (−) of the comparator circuit 170 exceeds a value (hereinafter denoted by Vth(−)) determined by voltages applied to the resistors 168 and 169 respectively through division of the voltage of the internal power supply 167, so the output (hereinafter denoted by Vout) from the comparator circuit 170 assumes "H" level. As a result, the transistor 172 is turned ON via the resistor 171.

The voltage determined by the voltages applied to the resistors 168 and 169 respectively through division of the voltage of the internal power supply 167 is set equal to or higher than a forward voltage of the diode 162. The transistor 175 is turned ON via the resistor 173. The transistor 172 is turned ON, so the voltage V(−) becomes near 0 V The transistor 175 is turned ON, so the base of the transistor 177 assumes "L" level via the resistor 178, and the initially turned-ON transistor 177 is turned OFF. Thus, a current flows through the collector of the transistor 165 due to the constant current source 163 (current Iout), so the current mirror circuit 166 is turned ON. A current equivalent to the current Iout flows through the collector of the transistor 164, so electric charges in the capacitor 161 are discharged via the diode 162. The voltage V(+) has a surplus corresponding to the forward voltage of the diode 162, so the voltage Vout is constantly at "H" level.

When the secondary current I2 flows and the pulse output I2pulse is transmitted from the secondary current pulse circuit 16 to the timer circuit 110 at a stage subsequent thereto at the time point t1, the transistor 174 is turned ON. Thus, the transistor 172 is turned OFF, so the voltage V(−) changes from near 0 V to Vth(−). This voltage is higher than V(+), so the voltage Vout is inverted to assume "L" level. Thus, the transistor 175 is turned OFF via the resistor 173, so the base of the transistor 177 assumes "H" level. As a result, the transistor 177 is turned ON.

Thus, the current mirror circuit 166 is turned OFF, so no more electric charges are discharged from the capacitor 161 via the transistor 164. Consequently, the voltage V(+) rises linearly (along a straight line) (with gradient (1)) due to the current Iin and the capacitance of the capacitor 161. In the meantime, the voltage Vout is at "L" level. Therefore, the transistor 175 is turned OFF via the resistor 173, so the base of the transistor 181 assumes "H" level. Also, the transistor 181 is turned ON via the resistor 179, so the base and the collector of the transistor 183 assume "L" level and "H" level, respectively.

At this moment, an "H"-level output is supplied to the output terminal 11aa via the resistor 184, and the transistor 15 of the waveform shaping circuit 6 is thereby turned ON, so the output terminal 6a of the waveform shaping circuit 6 assumes "L" level. Therefore, the Gate voltage assumes "L" level via the drive circuit 7, so the switching element 5 is turned OFF. Further, an "H"-level output is supplied to the output terminal 11bb via the resistor 185. As described in the second embodiment of the present invention, while the input terminal 12c is at "H" level in the ion signal output circuit 12, the output voltage of the ion signal Ion is generated from the output terminal 12a in the signal line L1 (Igt in FIG. 9). The ion current Ion starts flowing at the time point t2.

When the voltage V(+) reaches Vth(−) at the time point t3, the voltage Vout thereby assumes "H" level. Thus, the transistor 172 is turned ON via the resistor 171, so the voltage V(−) falls to near 0 V. Further, the transistor 175 is turned ON due to an "H"-level signal transmitted via the resistor 173, so the transistor 177 is turned OFF due to an "L"-level signal transmitted via the resistor 178. Therefore, the current mirror circuit 166 is turned ON, so the electric charges in the capacitor 161 are discharged via the diode 162. At this moment, the voltage (+) falls linearly (along a straight line) (with gradient (2)) due to a current obtained by subtracting the current Iin from the current Iout and the capacitance of the capacitor 161. The voltage Vout assumes "H" level, so the output signal Tout assumes "L" level. Therefore, the output voltage of the ion signal Ion is not supplied any more, and the voltage at the output terminal 6a of the waveform shaping circuit 6 stops depending on the timer circuit 110.

The gradient (2) needs to be set gentler than the gradient (1). In a case where the gradient (1) is gentler than the gradient (2), the length of the time when the output signal Tout is at "H" level, namely, the length of the pulse Tout1 does not change depending on the ignition cycle.

The gradient (1) is determined as expressed in an expression: $V=(Iin \times C) \times t$ using the current value Iin of the constant current source 160 and a capacitance C of the capacitor 161. The gradient (2) is determined as expressed in an expression: $V=((Iout-Iin)/C) \times t$ using a value obtained by subtracting the current Iin from the current value Iout of the constant current source 163 and the capacitance C of the capacitor 161. The cycle of the pulse Tout1 is set with the pulse I2pulse regarded as a trigger.

In the case of a high ignition frequency, the voltage V(+) has not fallen sufficiently when a subsequent ignition signal is input (at time point t4). Therefore, the length of time from a moment when the output signal Tout assumes "H" level to a moment when the output signal Tout shifts to "L" level (from time point t4 to time point t6) is reduced, so the length of time for outputting the ion signal is reduced.

An additional description will be given as to a change in the period for detecting an ion current. Referring to FIG. 9, the voltage V(+) at the input terminal (+) of the comparator circuit 170 rises at the time point t1. This voltage rises linearly through the supply of a constant current to the capacitor 161. The length of the time required until the voltage V(+) reaches the voltage Vth(−) as a threshold changes depending on the ignition frequency (i.e., conduction frequency of a secondary current). The voltage V(+) is V(+)1 at the time point t1 (see FIG. 9), but rises to V(+)2 at the time point t4. This is because the secondary current is conducted for the second time before the voltage V(+) falls to V(+)1 in response to the first conduction of the secondary current. During the second conduction of the secondary current, therefore, the length of the time required until the voltage V(+) reaches Vth(−) is reduced.

The length of the time for detecting the ion current is shorter at the time of the second ignition than at the time of the first ignition. The earlier the second ignition occurs, the higher the voltage V(+)2 becomes. Therefore, the length of the time required until the voltage V(+) reaches Vth(−) is reduced. On the contrary, the later the second ignition occurs, the closer to V(+)1 the voltage V(+)2 becomes. Therefore, the length of the time required until the voltage V(+) reaches Vth(−) increases.

In the first and second embodiments of the present invention, the length of the time for detecting the ion current is not changed but fixed to a detection period (i.e., short period) at a time point corresponding to the highest ignition frequency, namely, a detection period for completing detection within a certain time length. Thus, the ion current is detected on this short cycle even when the ignition frequency is low, so a further improvement is made in the third embodiment of the present invention so as to detect the ion current for the longest possible period.

In the ignition control system shown in FIG. 8, the ion signal output circuit 12 and the ion signal detection/control portion 203 may also be replaced respectively by the ion signal output circuit 120 and the ion signal detection/control portion 203a according to the foregoing first embodiment of the present invention shown in FIG. 4. The configuration and operation of those components have been described in the foregoing first embodiment of the present invention and hence will not be described below.

In the third embodiment of the present invention, as described above, the predetermined time obtained from the timer circuit 110 is set based on the ignition frequency by dint of the timer circuit 110 with the signal obtained from the secondary current regarded as a trigger, using the secondary current and ion current detecting unit (8, 90) for detecting the secondary current and the ion current and the ion signal generating unit (110, 12, 16) including the secondary current pulse circuit 16, the timer circuit 110, and the ion signal output circuit 12. The ion current is detected in the meantime, so the length of time for detecting the ion current can be set long in the case of a low ignition frequency. It is therefore possible to detect the ion current stably and hence perform control with high reliability.

What is claimed is:

1. An ignition device of an ignition control system for an internal combustion engine, comprising:
    an ignition coil having a primary coil and a secondary coil;
    a switching element for causing a primary current to be conducted through and shut off from the primary coil of the ignition coil;
    a waveform shaping circuit for shaping a waveform of an ignition signal transmitted from an outside through a signal line to supply a conduction signal thus obtained to the switching element;
    ion current detecting means connected to the secondary coil of the ignition coil, for detecting an ion current flowing through the secondary coil; and
    ion signal generating means for outputting an ion signal, which indicates the ion current detected for a predetermined period after the conduction signal of the waveform shaping circuit has been turned off, to the outside through the signal line while blocking transfer of the conduction signal from the waveform shaping circuit.

2. The ignition device of an ignition control system for an internal combustion engine according to claim 1, wherein:
    the ion signal generating means includes:
    a differentiating circuit for outputting a pulse signal indicating a falling of the conduction signal of the waveform shaping circuit during turning-off of the waveform shaping circuit;
    a timer circuit for generating an output signal for the predetermined period upon receiving the pulse signal from the differentiating circuit; and
    an ion signal output circuit for outputting the ion signal to the outside while the output signal from the timer circuit is present; and
    the timer circuit generates the output signal to block transfer of the conduction signal from the waveform shaping circuit.

3. The ignition device of an ignition control system for an internal combustion engine according to claim 2, wherein:
    the ion signal output circuit includes a parallel circuit constructed by connecting a transistor and a constant current source in parallel to each other to cause a current corresponding to the detected ion current to flow therethrough while the output signal from the timer circuit is present; and
    the ion signal output circuit outputs to the outside an ion signal resulting from the current flowing through the parallel circuit.

4. An ignition device of an ignition control system for an internal combustion engine, comprising:
    an ignition coil having a primary coil and a secondary coil;
    a switching element for causing a primary current to be conducted through and shut off from the primary coil of the ignition coil;

a waveform shaping circuit for shaping a waveform of an ignition signal transmitted from an outside through a signal line to supply a conduction signal thus obtained to the switching element;

secondary current and ion current detecting means connected to the secondary coil of the ignition coil, for detecting a secondary current and an ion current flowing through the secondary coil; and ion signal generating means for outputting an ion signal, which indicates the ion current detected for a predetermined period after the secondary current has flowed, to the outside through the signal line while blocking transfer of the conduction signal from the waveform shaping circuit.

5. The ignition device of an ignition control system for an internal combustion engine according to claim 4, wherein:

the ion signal generating means includes:

a secondary current pulse circuit for generating a pulse indicating that the detected secondary current has exceeded a predetermined value;

a timer circuit for generating an output signal for the predetermined period; and an ion signal output circuit for outputting the ion signal to the outside while the output signal from the timer circuit is present; and the timer circuit generates the output signal to block transfer of the conduction signal from the waveform shaping circuit.

6. The ignition device of an ignition control system for an internal combustion engine according to claim 4, wherein the secondary current and ion current detecting means includes two current mirror circuits connected to a low-voltage side of the secondary coil to cause a secondary current and an ion current to flow, respectively.

7. The ignition device of an ignition control system for an internal combustion engine according to claim 5, wherein the secondary current and ion current detecting means includes two current mirror circuits connected to a low-voltage side of the secondary coil to cause a secondary current and an ion current to flow, respectively.

8. The ignition device of an ignition control system for an internal combustion engine according to claim 5, wherein:

the ion signal output circuit includes a parallel circuit constructed by connecting a transistor and a constant current source in parallel to each other to cause a current corresponding to the detected ion current to flow therethrough while the output signal from the timer circuit is present; and the ion signal output circuit outputs to the outside an ion signal resulting from the current flowing through the parallel circuit.

9. An ignition device of an ignition control system for an internal combustion engine, comprising:

an ignition coil having a primary coil and a secondary coil;

a switching element for causing a primary current to be conducted through and shut off from the primary coil of the ignition coil;

a waveform shaping circuit for shaping a waveform of an ignition signal transmitted from an outside through a signal line to supply a conduction signal thus obtained to the switching element;

secondary current and ion current detecting means connected to the secondary coil of the ignition coil, for detecting a secondary current and an ion current flowing through the secondary coil; and ion signal generating means for outputting an ion signal, which indicates the ion current detected for a predetermined period set based on an ignition frequency after the secondary current has been flowed, to the outside through the signal line while blocking transfer of the conduction signal from the waveform shaping circuit.

10. The ignition device of an ignition control system for an internal combustion engine according to claim 9, wherein:

the ion signal generating means includes:

a secondary current pulse circuit for generating a pulse indicating that the detected secondary current has exceeded a predetermined value;

a timer circuit for generating an output signal for the period, which is set based on the ignition frequency derived from a difference in time between a secondary current flowing immediately before the ion current after a falling of the pulse and a secondary current generated during a preceding process of ignition; and an ion signal output circuit for outputting the ion signal to the outside while the output signal from the timer circuit is present; and the timer circuit generates the output signal to block transfer of the conduction signal from the waveform shaping circuit.

11. The ignition device of an ignition control system for an internal combustion engine according to claim 9, wherein the secondary current and ion current detecting means includes two current mirror circuits connected to a low-voltage side of the secondary coil to cause a secondary current and an ion current to flow, respectively.

12. The ignition device of an ignition control system for an internal combustion engine according to claim 10, wherein the secondary current and ion current detecting means includes two current mirror circuits connected to a low-voltage side of the secondary coil to cause a secondary current and an ion current to flow, respectively.

13. The ignition device of an ignition control system for an internal combustion engine according to claim 10, wherein:

the ion signal output circuit includes a parallel circuit constructed by connecting a transistor and a constant current source in parallel to each other to cause a current corresponding to the detected ion current to flow therethrough while the output signal from the timer circuit is present; and the ion signal output circuit outputs to the outside an ion signal resulting from the current flowing through the parallel circuit.

* * * * *